(12) United States Patent
Sudi

(10) Patent No.: US 11,535,486 B2
(45) Date of Patent: Dec. 27, 2022

(54) DETERMINING ELEVATOR CAR LOCATION USING VIBRATIONS

(71) Applicant: OTIS ELEVATOR COMPANY, Farmington, CT (US)

(72) Inventor: Sandeep Sudi, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1164 days.

(21) Appl. No.: 16/107,236

(22) Filed: Aug. 21, 2018

(65) Prior Publication Data

US 2020/0062542 A1 Feb. 27, 2020

(51) Int. Cl.
| | | |
|---|---|---|
| B66B 1/34 | (2006.01) | |
| B66B 1/40 | (2006.01) | |
| G05B 19/4067 | (2006.01) | |
| B66B 1/52 | (2006.01) | |

(52) U.S. Cl.
CPC ............. *B66B 1/3492* (2013.01); *B66B 1/40* (2013.01); *G05B 19/4067* (2013.01); *B66B 1/52* (2013.01)

(58) Field of Classification Search
CPC ................... B66B 5/00; B66B 5/0006; B66B 5/0018–0037; B66B 5/02–022; B66B 1/3492
See application file for complete search history.

(56) References Cited

U.S. PATENT DOCUMENTS

| | | | |
|---|---|---|---|
| 4,389,631 A | 6/1983 | Kajiyama et al. | |
| 6,526,368 B1 | 2/2003 | Coste et al. | |
| 6,701,277 B2 | 3/2004 | Coste et al. | |
| 7,540,358 B2 | 6/2009 | Okamoto et al. | |
| 7,546,903 B2 | 6/2009 | Kattainen et al. | |
| 8,408,364 B2 | 4/2013 | Kangas | |
| 8,540,057 B2 | 9/2013 | Schuster et al. | |
| 9,033,114 B2 | 5/2015 | Mizon | |
| 9,469,501 B2 | 10/2016 | Lee | |
| 9,617,115 B2 | 4/2017 | Sarjanen et al. | |
| 9,676,591 B2 | 6/2017 | Banno et al. | |
| 9,771,240 B2 | 9/2017 | Martin | |
| 9,958,250 B2 | 5/2018 | Reilio et al. | |
| 9,975,738 B2 | 5/2018 | Ramakrishnan et al. | |
| 2016/0039635 A1 | 2/2016 | Kangas | |
| 2018/0072534 A1 | 3/2018 | Li | |

FOREIGN PATENT DOCUMENTS

| | | |
|---|---|---|
| CN | 110844726 A | 2/2020 |
| EP | 0839750 A2 | 5/1998 |
| EP | 3124417 A1 | 2/2017 |
| EP | 3594160 A1 | 1/2020 |
| JP | 2008150186 A | 7/2008 |
| WO | 2015068322 A1 | 5/2015 |

OTHER PUBLICATIONS

European Search Report for Application No. 19192817.5; dated Mar. 20, 2020; 5 Pages.

*Primary Examiner* — Christopher Uhlir
(74) *Attorney, Agent, or Firm* — Cantor Colburn LLP

(57) ABSTRACT

Methods and systems for determining elevator car locations are provided. Aspects includes operating, by a processor, a machine room sensor to collect vibration data associated with one or more components in a machine room of an elevator system, wherein the elevator system comprises an elevator car and a hoistway and analyzing the vibration data to determine a position of the elevator car in the hoistway.

19 Claims, 4 Drawing Sheets

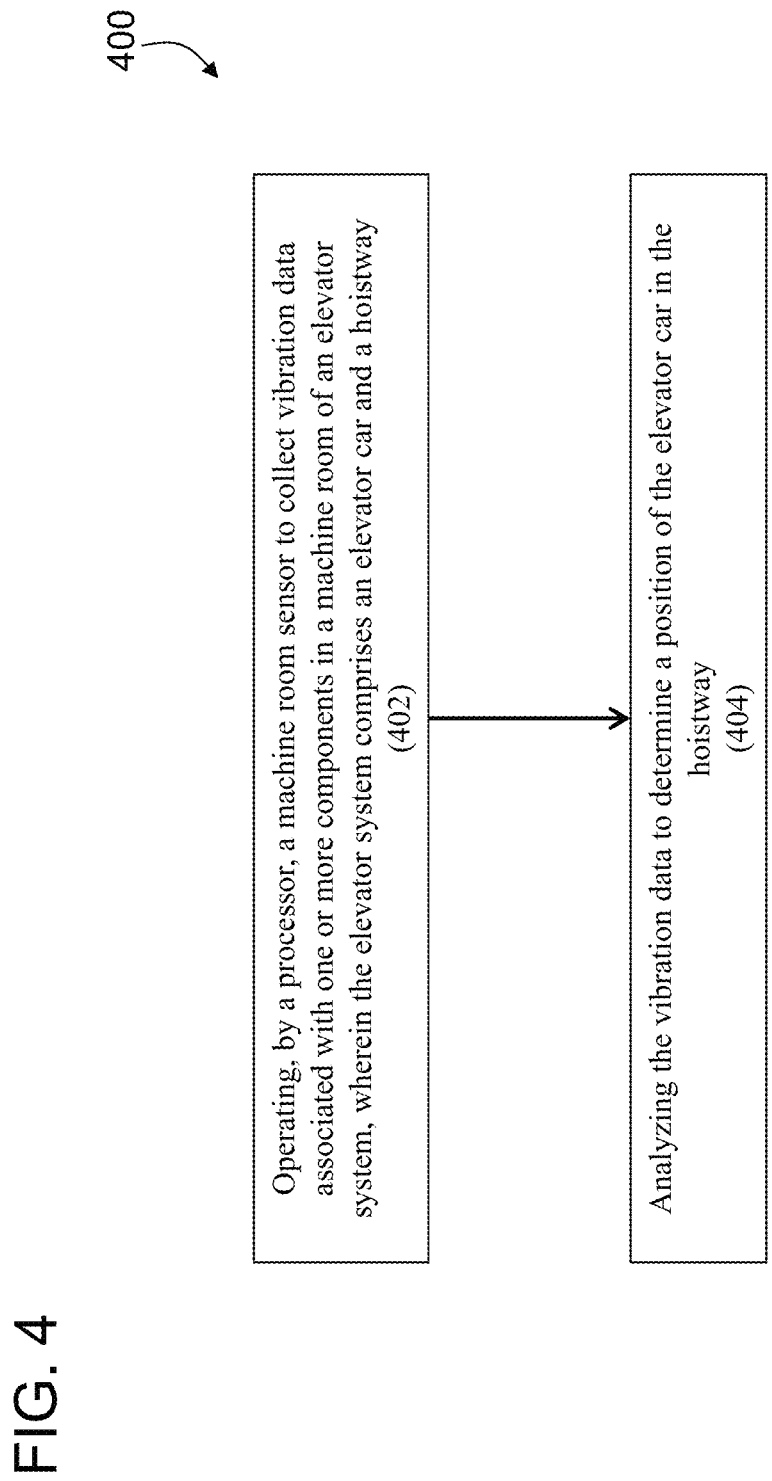

DETERMINING ELEVATOR CAR LOCATION USING VIBRATIONS

BACKGROUND

The subject matter disclosed herein generally relates to elevator systems and, more particularly, to a system for determining elevator car location in an elevator system using vibrations.

Elevator systems typically operate with a variety of sensors that are utilized to determine the position of an elevator car within a hoistway. At the same time, sensor data can be collected to predict maintenance needs and any changes to operating conditions. Sensor data collected from a variety of sensors is most useful when tied to a location of the elevator car within a hoistway.

BRIEF DESCRIPTION

According to one embodiment, a system is provided. The system includes a controller coupled to a memory, a sensor affixed to a location proximate to a machine for an elevator system, wherein the elevator system comprising a hoistway and an elevator car, and wherein the controller is configured to operate the sensor to collect vibration data associated with one or more components of the machine and analyze the vibration data to determine a position of the elevator car in the hoistway.

In addition to one or more of the features described above, or as an alternative, further embodiments of the system may include a proximity sensor affixed to a moving component of the elevator car the sensor operated by the controller and a sensor affixed to a location within the hoistway of the elevator system.

In addition to one or more of the features described above, or as an alternative, further embodiments of the system may include that the sensor is a passive actuator.

In addition to one or more of the features described above, or as an alternative, further embodiments of the system may include that the controller is further configured to perform an initialization operation for the elevator car, the initialization operation comprising operating the elevator car to travel to a synchronization floor in the hoistway, the synchronization floor corresponds to the location in the hoistway of the actuator, operating the elevator car to travel to each floor of a plurality of floors in the hoistway and collecting, by the machine room sensor, vibration data, and storing the vibration data in a memory.

In addition to one or more of the features described above, or as an alternative, further embodiments of the system may include that the controller is further configured to collect travel time data during the initialization operation for the elevator car.

In addition to one or more of the features described above, or as an alternative, further embodiments of the system may include that the controller is further configured to collect, by the machine room sensor, synchronization data from a component of the machine room, wherein synchronization data comprises vibration data associated with operation of the elevator car and analyze the synchronization data to determine that the elevator car is located at a synchronization location in the hoistway.

In addition to one or more of the features described above, or as an alternative, further embodiments of the system may include that the controller is further configured to responsive to determining that the elevator car is located at the synchronization location, operate the elevator car to travel to each floor of a plurality of floors in the hoistway and collect, by the machine room sensor, vibration data and store the vibration data in a memory.

In addition to one or more of the features described above, or as an alternative, further embodiments of the system may include that the controller is further configured to based at least on a determination of the position of the elevator car in the hoistway, operate an elevator operation sensor to collect elevator operation data associated with the elevator car and associate the elevator operation data with the position of the elevator car.

In addition to one or more of the features described above, or as an alternative, further embodiments of the system may include that the controller is further configured to transmit the elevator operation data to a condition based maintenance system.

In addition to one or more of the features described above, or as an alternative, further embodiments of the system may include that determining the position of the elevator car in the hoistway comprises comparing the vibration data to the vibration data stored in memory to identify the position of the elevator car in the hoistway.

In addition to one or more of the features described above, or as an alternative, further embodiments of the system may include that the controller is further configured to generate a confidence score for one or more floor locations in the hoistway based on the comparing the vibration data to the vibration data stored in the memory, wherein determining the position of the elevator car in the hoistway is based at least in part on the confidence score for the one or more floor locations.

According to one embodiment, a method is provided. The method includes operating, by a processor, a machine room sensor to collect vibration data associated with one or more components in a machine room of an elevator system, wherein the elevator system comprises an elevator car and a hoistway and analyzing the vibration data to determine a position of the elevator car in the hoistway.

In addition to one or more of the features described above, or as an alternative, further embodiments of the method may include that wherein the elevator system further comprises a proximity sensor affixed to a moving component of the elevator car and a sensor affixed to a location within the hoistway of the elevator system.

In addition to one or more of the features described above, or as an alternative, further embodiments of the method may include that perform an initialization operation for the elevator car, the initialization operation comprising operating the elevator car to travel to a synchronization floor in the hoistway, the synchronization floor corresponds to the location in the hoistway of the actuator, operating the elevator car to travel to each floor of a plurality of floors in the hoistway and collecting, by the machine room sensor, vibration data, and storing the vibration data in a memory.

In addition to one or more of the features described above, or as an alternative, further embodiments of the method may include collecting travel time data during the initialization operation for the elevator car.

In addition to one or more of the features described above, or as an alternative, further embodiments of the method may include collecting, by the machine room sensor, synchronization data from a component of the machine room, wherein synchronization data comprises vibration data associated with operation of the elevator car and analyzing the synchronization data to determine that the elevator car is located at a synchronization location in the hoistway.

In addition to one or more of the features described above, or as an alternative, further embodiments of the method may include responsive to determining that the elevator car is located at the synchronization location, operating the elevator car to travel to each floor of a plurality of floors in the hoistway and collecting, by the machine room sensor, vibration data and storing the vibration data in a memory.

In addition to one or more of the features described above, or as an alternative, further embodiments of the method may include based at least on a determination of the position of the elevator car in the hoistway, operating an elevator operation sensor to collect elevator operation data associated with the elevator car and associating the elevator operation data with the position of the elevator car.

In addition to one or more of the features described above, or as an alternative, further embodiments of the method may include transmitting the elevator operation data to a condition based maintenance system.

In addition to one or more of the features described above, or as an alternative, further embodiments of the method may include that determining the position of the elevator car in the hoistway comprises comparing the vibration data to the vibration data stored in memory to identify the position of the elevator car in the hoistway.

BRIEF DESCRIPTION OF THE DRAWINGS

The present disclosure is illustrated by way of example and not limited in the accompanying figures in which like reference numerals indicate similar elements.

FIG. 4 depicts a flow diagram of a method for determining elevator car locations according to one or more embodiments of the disclosure.

DETAILED DESCRIPTION

Figure 1:
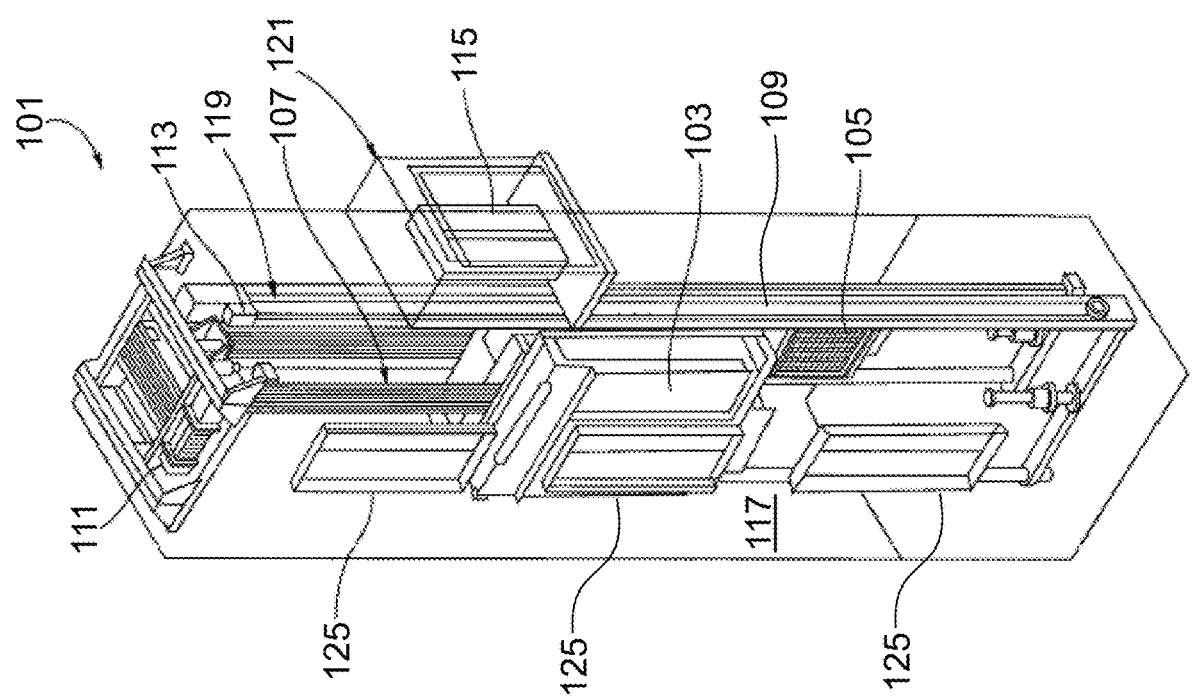
FIG. 1 is a schematic illustration of an elevator system that may employ various embodiments of the disclosure.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

FIG. 1 is a perspective view of an elevator system 101 including an elevator car 103, a counterweight 105, a roping 107, a guide rail 109, a machine 111, a position encoder 113, and a controller 115. The elevator car 103 and counterweight 105 are connected to each other by the roping 107. The roping 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The roping 107 engages the machine 111, which is part of an overhead structure of the elevator system 101. The machine 111 is configured to control movement between the elevator car 103 and the counterweight 105. The position encoder 113 may be mounted on an upper sheave of a speed-governor system 119 and may be configured to provide position signals related to a position of the elevator car 103 within the elevator shaft 117. In other embodiments, the position encoder 113 may be directly mounted to a moving component of the machine 111, or may be located in other positions and/or configurations as known in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position encoder 113. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor.

Although shown and described with a roping system, elevator systems that employ other methods and mechanisms of moving an elevator car within an elevator shaft, such as hydraulic and/or ropeless elevators, may employ embodiments of the present disclosure. FIG. 1 is merely a non-limiting example presented for illustrative and explanatory purposes.

Figure 2:
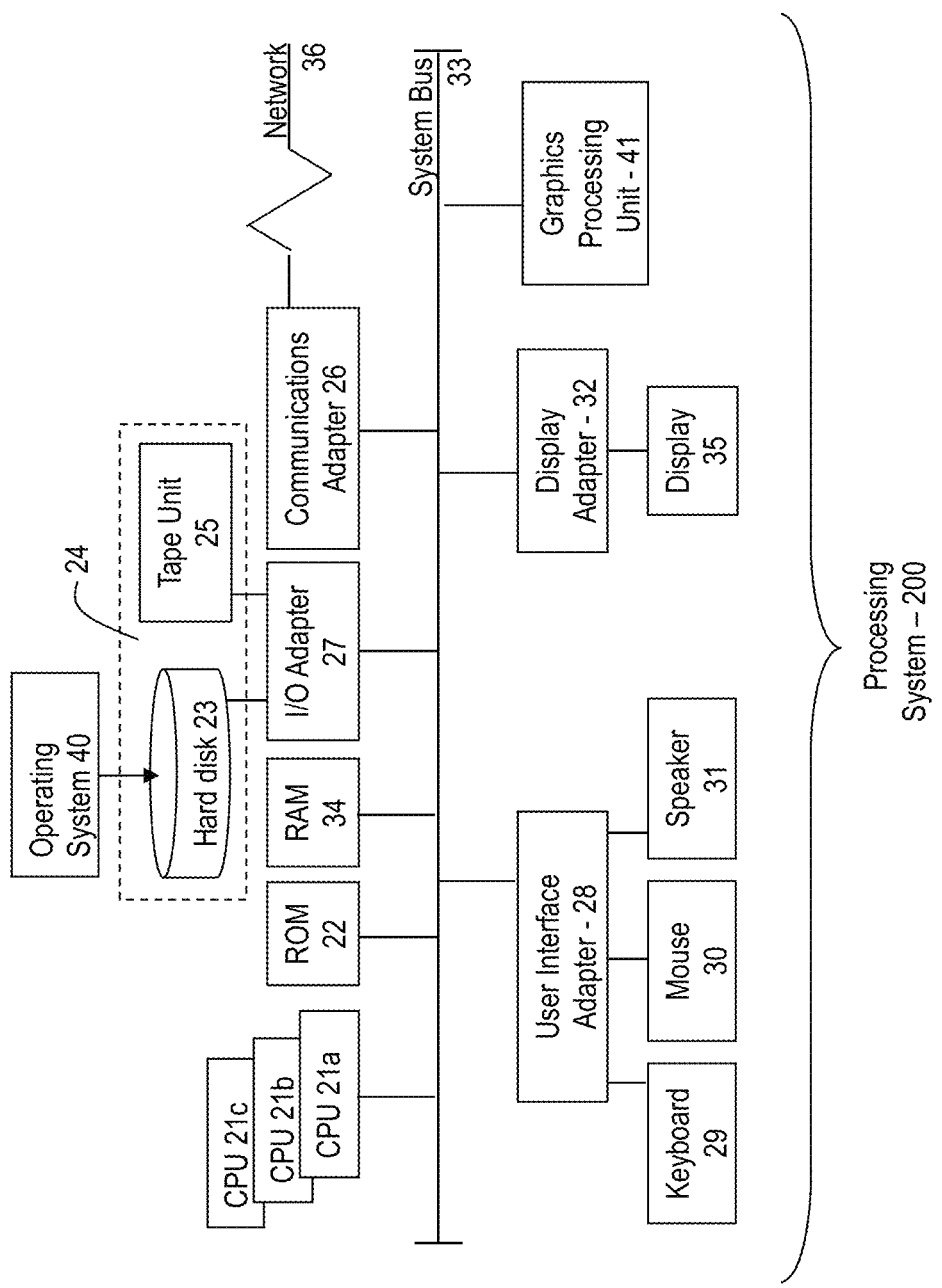
FIG. 2 depicts a block diagram of a computer system for use in implementing one or more embodiments of the disclosure.

Referring to FIG. 2, there is shown an embodiment of a processing system 200 for implementing the teachings herein. In this embodiment, the system 200 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 (RAM) and various other components via a system bus 33. Read only memory (ROM) 22 is coupled to the system bus 33 and may include a basic input/output system (BIOS), which controls certain basic functions of system 200.

FIG. 2 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 200 may be stored in mass storage 24. A network communications adapter 26 interconnects bus 33 with an outside network 36 enabling data processing system 200 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 200 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel. The processing system 200 described herein is merely exemplary and not intended to limit the application, uses, and/or technical scope of the present disclosure, which can be embodied in various forms known in the art.

Thus, as configured in FIG. 2, the system 200 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 2. FIG. 2 is merely a non-limiting example presented for illustrative and explanatory purposes.

Turning now to an overview of technologies that are more specifically relevant to aspects of the disclosure, collection of elevator performance data can be useful for predicting maintenance needs for the elevator system. However, in order to help make elevator performance data as useful as possible for predicting these maintenance needs, the data should be coupled with specific locations of the elevator within the elevator hoistway. For example, if a landing door is determined to be malfunctioning based on some sensor readings, to assist with repair, the sensor data needs to be tied to the specific floor so maintenance can be performed on the correct door. Likewise, maintenance personnel might want to know if poor door performance is linked to all landing doors, or specific landing doors. Typically, an elevator system can know at which floor an elevator is located by using a monitoring device capable of communicating with the elevator controller, or by utilizing sensors in the hoistway to determine which floor the elevator car is passing or landing on. However, installing these sensors in communication with an elevator controller can be expensive especially for existing elevator systems. There exists a need for an easy to install, low cost system that can determine the location of an elevator car within the elevator hoistway.

Turning now to an overview of the aspects of the disclosure, one or more embodiments address the above-described shortcomings of the prior art by providing an elevator car location sensing system utilizing a combination of a proximity sensor located on a moving component of an elevator within a hoistway of a building. Also, a passive actuator is located at a fixed location within the hoistway. The passive actuator can be sensed by the proximity sensor and because the passive actuator is at a fixed location, the elevator car location can be synchronized (initialized) at that fixed location. For example, the passive actuator can be located at a specific floor of a building (e.g., top floor) and the elevator car is synchronized when it travels to that specific floor. In one or more embodiments, the elevator car location sensing system can also utilize a sensor located in a control area such as a machine room or any other location of the elevator system such as, for example, on the machine itself or attached to a sheave. This sensor can detect vibration patterns when the elevator car is operation. Based on these vibration patterns, a controller in electronic communication with the sensor can learn and determine the location of the elevator car within the hoistway. The detection of vibration patterns along with the synchronization sensors described above can determine elevator car location. The elevator car location sensing system can trigger other sensors (vibration sensors, etc.) to collect sensor data which can be saved and/or transmitted to a condition based management (CBM) system. Some example sensor data that can be collected by the other sensors includes floor level accuracy sensing and other similar information related to each landing. In one or more embodiments, the elevator car location sensing system can be utilized during installation of new elevator systems or can be utilized to retro-fit existing elevator systems due to the independence of the elevator car location sensing system.

Figure 3:
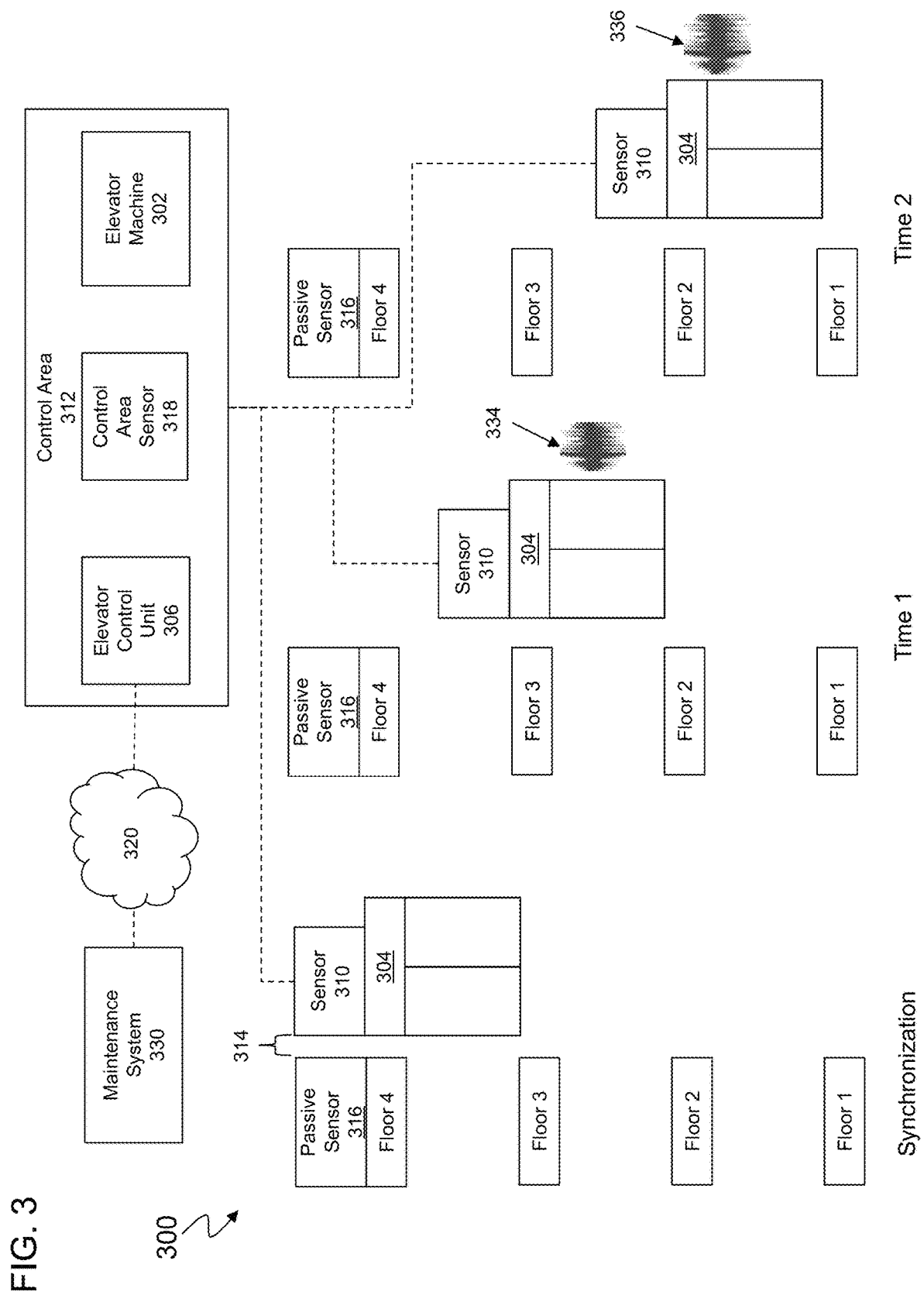
FIG. 3 depicts a block diagram of an elevator system 300 with a sensor system for determining elevator car locations according to one or more embodiments of the disclosure.

Turning now to a more detailed description of aspects of the present disclosure, FIG. 3 depicts an elevator system 300 with a sensor system for determining elevator car location. The system 300 includes an elevator car 304 operating in a hoistway of a building. In the illustrated example, the elevator car 304 is shown maneuvering to different floors within a hoistway at different time periods (e.g., synchronization, time 1, and time 2 as indicted below each elevator location. Also, the building hoistway includes floors 1, 2, 3, and 4. The elevator car 304 includes a sensor 310 affixed to a moving component of the elevator car 304. Located at one (or more) of the floors in the hoistway is a passive sensor 316 (herein, located at the top floor (floor 4)). The system 300 includes a control area 312 housing the elevator machine 302 which provides mechanical operations for the elevator car 304 to operate throughout the hoistway. The elevator machine 302 can include both a motor and a sheave utilized for moving the elevator car 304 in the hoistway. The control area 312 includes a control area sensor 318 The sensors described herein can be controlled by the elevator control unit 306 which is connected to network 320. Through the network 320, the elevator control unit 306 can communicate with a maintenance system 330. The maintenance system 330 can be any type of maintenance system such as a condition based maintenance (CBM) system.

In one or more embodiments, the elevator control unit 306, sensor 310, and control area sensor 318 can be implemented on the processing system 200 found in FIG. 2. Additionally, a cloud computing system can be in wired or wireless electronic communication with one or all of the elements of the system 300. Cloud computing can supplement, support or replace some or all of the functionality of the elements of the system 300. Additionally, some or all of the functionality of the elements of system 300 can be implemented as a node of a cloud computing system. A cloud computing node is only one example of a suitable cloud computing node and is not intended to suggest any limitation as to the scope of use or functionality of embodiments described herein.

In one or more embodiments, the sensor 310 can be affixed to a moving component of the elevator car 304 such as, for example, the top portion of the elevator car 304 or the bottom or side portions of the elevator car 304. For example, the sensor 310 can be affixed to a sheave or counterweight in an elevator system. In yet another embodiment, the sensor 310 can be affixed to the door header of the elevator car 304 and positioned such that the sensor 310 can collect sensor data related to the passive sensor 316. The passive sensor 316 can be, for example, a passive actuator. Also, the passive sensor 316 can be affixed to a location in the hoistway of the elevator system to act as a reference location. For example, the reference location can be the top floor of a hoistway. As shown during the synchronization time period in FIG. 3, this reference location (Floor 4) will initialize the elevator car 304 position in the hoistway for the elevator control unit 306. Initialization refers to when the elevator control unit 306 can determine the exact location of the elevator car 304 in the hoistway based on the interaction 314 between the sensor 310 and the passive sensor 316. When the sensor 310 reads the passive sensor 316, the elevator control unit 306 can "know" with a level of certainty that the elevator car 304 is at the top of the hoistway (i.e., reference location). This reference location can then be utilized to further determine the position of the elevator car 304 along the hoistway as described further below.

In one or more embodiments, through operation of the elevator car 304 through the hoistway, the control area sensor 318 in the control area 302 can collect vibration data for locations in the hoistway 334, 336. The vibration data collected by the control area sensor 318 can be analyzed by the elevator control unit 306 either locally or in the cloud 320 to determine vibration signatures that are unique to specific locations in the hoistway. For example, a vibration with a specific amplitude or decibel level can be detected by the control area sensor 318 in the control area 312 as the elevator car 304 traverses the hoistway. Based on the reference floor and the time traveled by the elevator car in the hoistway, the vibration signature can be associated with a specific location. Also, vibration signatures can vary based on whether the elevator machine 302 is engaging the elevator car 304 in the up direction versus the down direction. In the illustrated example, a unique vibration signature 334 between floor 2 and floor 3 can be determined by the elevator control unit 306. This vibration signature 334 can be used to supplement the reference floor determined by the sensor 310 and passive sensor 316 for the top floor. The sensor 310 and passive sensor 316 act as a reference point for the elevator car 304 and the elevator control unit 306. Based on the detection, by the control area sensor 318, of a specific vibration signature in relation to a travel time from the reference location, the elevator control unit 306 can determine a location of the elevator car 304. In addition, as the elevator car 304 traverses the hoistway, additional vibration signatures 336 can be determined and utilized to determine the position of the elevator car 304 within the hoistway.

In one or more embodiments, the sensor 310 and passive sensor 316 are not utilized in the system 300. Instead, the control room sensor 318 can identifying a reference location in the hoistway that has a high likelihood of corresponding to a specific location in the hoistway. For example, initiating movement of the elevator car 304 from the top floor of a hoistway can have a unique vibration signature due to the mechanisms operating the elevator car 304. From this unique vibration signature, the elevator system 312 can utilize the location as a reference location for the elevator car 304. Additional reference locations can be added based on the detection of vibration signatures 334, 336 to supplement the determination of elevator car locations. In yet another embodiment, for hoistways with so called "express" travel corridors, the travel corridors' vibration patterns can be utilized as a reference location for the elevator control unit 306. Express travel corridors refer to high-rise buildings where elevator cars service a subset of floors along with the lobby. For example, in a 100 story building, the elevator car 304 might service floor 60-80 as well as the lobby. As the elevator car travels from floor 1 to floor 60, the elevator car 304 typically travels uninterrupted at top speeds. Knowing this travel pattern as well as comparing the vibration data, the elevator control unit 306 can determine a unique vibration signature to utilize as a reference location for the elevator car 304 in the hoistway. Typically when a car is in motion, there are a series of vibration bursts that can be sensed by the control area sensor 318. For example, if an elevator moves from floor 1 through floor 4, the machine vibrations would cross a certain threshold and these will run for a specific time. Algorithms can determine that three floors are elapsed. The direction of the car can be picked because in empty car down and up conditions, the machine loading is slightly different. In one case it works with gravity and in the other it is against gravity. Thus with direction, and vibration 'bursts' based on simple thresholding, the elevator control unit can determine the car position. Occasionally, the passive (synchronization) sensor 316 positioned at the topmost landing can be used to calibrate the system 200. For example, there could be a learn run during initial commissioning of the system. This synchronization can be triggered, for example, when there are power failures, the vibration signature could have crossed a certain threshold, and when a time that elevator may have stopped in the middle of hoistway. So certain corrections can be made accordingly. In one or more embodiments, the vibration signature for when an elevator car is travelling from the bottom landing to topmost landing or vice versa can be used as signatures to synchronize the algorithm used to determine the position of the car. In one or more embodiments, the vibration signature can have a few attributes such as, for example, a signal threshold level which determines when the machine 302 starts or stops. The start and stop are equivalent to the elevator car 304 moving from one landing and stopping at another landing. Some more attributes for the vibration signature include the time at which certain vibration signatures appear which is equivalent to the elevator car 304 moving for 4 seconds from one landing to another and also the maximum floor levels for a building that could determine the elevator car 304 direction.

FIG. 4 depicts a flow diagram of a method for determining elevator car locations according to one or more embodiments. The method 400 includes operating, by a processor, a machine room sensor to collect vibration data associated with one or more components in a machine room of an elevator system, wherein the elevator system comprises an elevator car and a hoistway, as shown in block 402. And at block 404, the method 400 includes analyzing the vibration data to determine a position of the elevator car in the hoistway.

Additional processes may also be included. It should be understood that the processes depicted in FIG. 4 represent illustrations and that other processes may be added or existing processes may be removed, modified, or rearranged without departing from the scope and spirit of the present disclosure.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for determining elevator car locations, the system comprising:
   a controller coupled to a memory;
   a sensor affixed to a location proximate to a machine for an elevator system, wherein the elevator system comprising a hoistway and an elevator car;
   wherein the controller is configured to:
      operate the sensor to collect vibration data associated with one or more components of the machine; and
      analyze the vibration data to determine a position of the elevator car in the hoistway.

2. The system of claim 1 further comprising:
   a proximity sensor affixed to a moving component of the elevator car, the proximity sensor operated by the controller; and
   a passive sensor affixed to a location within the hoistway of the elevator system.

3. The system of claim 2, wherein the controller is further configured to:
   perform an initialization operation for the elevator car, the initialization operation comprising:
      operating the elevator car to travel to a synchronization floor in the hoistway, the synchronization floor corresponds to a location in the hoistway of the passive sensor;
      operating the elevator car to travel to each floor of a plurality of floors in the hoistway and collecting, by the sensor, vibration data; and
      storing the vibration data in a memory.

4. The system of claim 3, wherein the controller is further configured to collect travel time data during the initialization operation for the elevator car.

5. The system of claim 1, wherein the controller is further configured to:
   collect, by the sensor, synchronization data from a component of the machine room, wherein synchronization data comprises vibration data associated with operation of the elevator car; and
   analyze the synchronization data to determine that the elevator car is located at a synchronization location in the hoistway.

6. The system of claim 5, wherein the controller is further configured to:
   responsive to determining that the elevator car is located at the synchronization location, operate the elevator car to travel to each floor of a plurality of floors in the hoistway and collect, by the sensor, vibration data; and
   store the vibration data in a memory.

7. The system of claim 1, wherein the controller is further configured to:
   based at least on a determination of the position of the elevator car in the hoistway, operate an elevator operation sensor to collect elevator operation data associated with the elevator car; and
   associate the elevator operation data with the position of the elevator car.

8. The system of claim 7, wherein the controller is further configured to transmit the elevator operation data to a condition based maintenance system.

9. The system of claim 3, wherein determining the position of the elevator car in the hoistway comprises comparing the vibration data to the vibration data stored in memory to identify the position of the elevator car in the hoistway.

10. The system of claim 9, wherein the controller is further configured to generate a confidence score for one or more floor locations in the hoistway based on the comparing the vibration data to the vibration data stored in the memory, wherein determining the position of the elevator car in the hoistway is based at least in part on the confidence score for the one or more floor locations.

11. A method for determining elevator car location, the method comprising:
    operating, by a processor, a machine room sensor to collect vibration data associated with one or more components in a machine room of an elevator system, wherein the elevator system comprises an elevator car and a hoistway; and
    analyzing the vibration data to determine a position of the elevator car in the hoistway.

12. The method of claim 11, wherein the elevator system further comprises:
    a proximity sensor affixed to a moving component of the elevator car; and
    a passive sensor affixed to a location within the hoistway of the elevator system.

13. The method of claim 12 further comprising:
    perform an initialization operation for the elevator car, the initialization operation comprising:
       operating the elevator car to travel to a synchronization floor in the hoistway, the synchronization floor corresponds to a location in the hoistway of the passive sensor;

operating the elevator car to travel to each floor of a plurality of floors in the hoistway and collecting, by the machine room sensor, vibration data; and storing the vibration data in a memory.

14. The method of claim 13 further comprising collecting travel time data during the initialization operation for the elevator car.

15. The method of claim 11 further comprising:

collecting, by the machine room sensor, synchronization data from a component of the machine room, wherein synchronization data comprises vibration data associated with operation of the elevator car; and analyzing the synchronization data to determine that the elevator car is located at a synchronization location in the hoistway.

16. The method of claim 15 further comprising:

responsive to determining that the elevator car is located at the synchronization location, operating the elevator car to travel to each floor of a plurality of floors in the hoistway and collecting, by the machine room sensor, vibration data; and storing the vibration data in a memory.

17. The method of claim 11 further comprising:

based at least on a determination of the position of the elevator car in the hoistway, operating an elevator operation sensor to collect elevator operation data associated with the elevator car; and associating the elevator operation data with the position of the elevator car.

18. The method of claim 17, further comprising transmitting the elevator operation data to a condition based maintenance system.

19. The method of claim 13, wherein determining the position of the elevator car in the hoistway comprises comparing the vibration data to the vibration data stored in memory to identify the position of the elevator car in the hoistway.

\* \* \* \* \*